United States Patent
Akai et al.

(10) Patent No.: US 9,505,958 B2
(45) Date of Patent: Nov. 29, 2016

(54) 1-BUTENE α-OLEFIN COPOLYMER COMPOSITION

(71) Applicant: Mitsui Chemicals, Inc., Minato-ku, Tokyo (JP)

(72) Inventors: Ikuo Akai, Narashino (JP); Tomohiro Abe, Chiba (JP); Koya Yoshimoto, Ichihara (JP); Masayoshi Yamaguchi, Chiba (JP); Shinya Tanaka, Ichihara (JP); Koji Matsunaga, Ichihara (JP); Makoto Egawa, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 14/426,951

(22) PCT Filed: Sep. 13, 2013

(86) PCT No.: PCT/JP2013/074872
§ 371 (c)(1),
(2) Date: Mar. 9, 2015

(87) PCT Pub. No.: WO2014/042249
PCT Pub. Date: Mar. 20, 2014

(65) Prior Publication Data
US 2015/0225623 A1   Aug. 13, 2015

(30) Foreign Application Priority Data

Sep. 14, 2012 (JP) ................................ 2012-203164

(51) Int. Cl.
| | | |
|---|---|---|
| C08F 210/08 | (2006.01) | |
| C09J 123/14 | (2006.01) | |
| C08L 23/08 | (2006.01) | |
| C08L 23/14 | (2006.01) | |
| C08L 23/04 | (2006.01) | |
| C08L 23/10 | (2006.01) | |
| C08L 23/18 | (2006.01) | |
| C09J 123/06 | (2006.01) | |

(52) U.S. Cl.
CPC .......... *C09J 123/142* (2013.01); *C08F 210/08* (2013.01); *C08L 23/04* (2013.01); *C08L 23/0815* (2013.01); *C08L 23/10* (2013.01); *C08L 23/142* (2013.01); *C08L 23/18* (2013.01); *C09J 123/06* (2013.01); *C08L 2203/162* (2013.01)

(58) Field of Classification Search
CPC .... C08L 23/10; C08L 23/04; C08L 23/0815; C08L 23/18; C08L 23/22; C08L 2203/22; C09J 123/142; C09J 123/06; C08F 210/08
See application file for complete search history.

(56) References Cited

U.S. PATENT DOCUMENTS

| | | | |
|---|---|---|---|
| 5,266,641 A | | 11/1993 | Asanuma et al. |
| 6,084,048 A | * | 7/2000 | Hozumi et al. ....... C08F 210/06 502/103 |
| 2005/0119428 A1 | | 6/2005 | Minami et al. |
| 2006/0155071 A1 | | 7/2006 | Morini et al. |
| 2009/0326156 A1 | | 12/2009 | Pellegatti et al. |
| 2011/0003939 A1 | | 1/2011 | Spataro et al. |

FOREIGN PATENT DOCUMENTS

| | | |
|---|---|---|
| EP | 1 215 239 B1 | 6/2002 |
| JP | S62-119213 A | 5/1987 |
| JP | H01-501950 A | 7/1989 |
| JP | H04-175317 A | 6/1992 |
| JP | H11-221884 A | 8/1999 |
| JP | 11-245355 A | 9/1999 |
| JP | 2000-191854 A | 7/2000 |
| JP | 2002-241553 A | 8/2002 |
| JP | 2004-051676 A | 2/2004 |
| JP | 2006-508237 A | 3/2006 |
| JP | 2010-500428 A | 1/2010 |
| JP | 2010-150433 A | 7/2010 |
| JP | 2011-513562 A | 4/2011 |
| WO | WO-03/070788 A1 | 8/2003 |

OTHER PUBLICATIONS

International Search Report dated Dec. 3, 2013 issued in Application No. PCT/JP2013/074872.

* cited by examiner

*Primary Examiner* — Nathan M Nutter
(74) *Attorney, Agent, or Firm* — Foley & Lardner LLP

(57) ABSTRACT

An object of the invention is to provide compositions which have low-temperature heat sealing properties, are free from stickiness, may achieve a heat seal strength controlled within a certain definite range when heat sealing takes place at low temperatures, have small changes in heat seal strength with time, and are such that in the packaging applications, the strength required to open the packages may be easily controlled within a certain definite range, and high-performance packages may be designed. The invention resides in a 1-butene.α-olefin copolymer composition including 99 to 1 parts by mass of at least one olefin polymer (X) selected from propylene polymers (X-1) and ethylene polymers (X-2), and 1 to 99 parts by mass of a 1-butene.α-olefin copolymer (Y) containing 0.1 to 30 mol % of one or more α-olefins selected from α-olefins and having a molecular weight distribution (Mw/Mn) of 1.0 to 3.5 [wherein the total of (X) and (Y) in the composition is 100 parts by mass].

11 Claims, 1 Drawing Sheet

1-BUTENE α-OLEFIN COPOLYMER COMPOSITION

CROSS REFERENCE TO RELATED APPLICATIONS

This application is the National Phase of PCT/JP2013/074872, filed Sep. 13, 2013, which claims priority to Japanese Application No. 2012-203164, filed Sep. 14, 2012.

TECHNICAL FIELD

The present invention relates to 1-butene.α-olefin copolymer compositions having excellent low-temperature heat sealing properties. More specifically, the invention relates to 1-butene.α-olefin copolymer compositions that have excellent low-temperature heat sealing properties and are suited for applications such as laminate layers, in particular, sealant layers and easy peel films on e.g. polypropylene films.

BACKGROUND ART

Polypropylene films such as biaxially-stretched polypropylene films are used in package materials. To improve heat seal strength, in particular, low-temperature heat seal strength of the polypropylene films, sealant compositions which are blends of resins such as polypropylenes with butene polymers are conventionally known.

For example, JP-A-H11-221884 (Patent Literature 1) discloses a resin composition for sealant film including a polypropylene resin, an ethylene.α-olefin random copolymer and a butene.α-olefin random copolymer.

Further, JP-A-H11-245355 (Patent Literature 2) discloses a sealant composition which is made by blending a specific propylene 1-butene random copolymer with a specific 1-butene.α-olefin random copolymer.

Although films (packages) formed with these compositions show some improvements in low-temperature heat sealability, it is often the case that the films are sticky. Further, difficulties are encountered in controlling the heat seal strength within a certain definite range when heat sealing takes place at low temperatures. In the packaging applications, this causes variations in the strength required to open the packages. Further, the strength required to open packages is apt to change with the lapse of time, and quality control is frequently difficult.

CITATION LIST

Patent Literature

Patent Literature 1: JP-A-H11-221884
Patent Literature 2: JP-A-H11-245355

SUMMARY OF INVENTION

Technical Problem

The present invention proposes compositions aimed at remedying these problems. In detail, the invention provides compositions suited as sealants or easy peel sealants which may be easily formed with a low-temperature heat seal strength controlled within a certain definite range by virtue of the selection of a specific 1-butene.α-olefin copolymer.

Solution to Problem

The present invention has the following aspects.

(1) An aspect of the invention resides in a 1-butene.α-olefin copolymer composition including:

99 to 1 parts by mass of at least one olefin polymer (X) selected from propylene polymers (X-1) containing 50 mol % or more of propylene and ethylene polymers (X-2) containing 50 mol % or more of ethylene; and 1 to 99 parts by mass of a 1-butene.α-olefin copolymer (Y) containing 99.9 to 70 mol % of 1-butene and 0.1 to 30 mol % of one or more α-olefins selected from ethylene, propylene and C5 to C12 α-olefins (wherein the total of the 1-butene and the one or more α-olefins selected from ethylene, propylene and C5 to C12 α-olefins is 100 mol %) and having a molecular weight distribution (Mw/Mn) of 1.0 to 3.5 [wherein the total of the olefin polymer (X) and the 1-butene.α-olefin copolymer (Y) in the composition is 100 parts by mass].

(2) In the 1-butene.α-olefin copolymer composition described in (1), the olefin polymer (X) is preferably one or more polymers selected from propylene polymers (X-1).

(3) In the 1-butene.α-olefin copolymer composition described in (2), the propylene polymer (X-1) is preferably one or more polymers selected from propylene random copolymers.

(4) In the 1-butene.α-olefin copolymer composition described in (1), the olefin polymer (X) is preferably one or more polymers selected from ethylene polymers (X-2).

(5) In the 1-butene.α-olefin copolymer composition described in (1), the 1-butene.α-olefin copolymer (Y) is preferably at least one or more copolymers selected from 1-butene ethylene copolymers (Y-1) containing 99.9 to 85 mol % of 1-butene and 0.1 to 15 mol % of ethylene [wherein the total of the 1-butene and the ethylene is 100 mol %] and 1-butene propylene copolymers (Y-2) containing 99.9 to 70 mol % of 1-butene and 0.1 to 30 mol % of propylene (wherein the total of the 1-butene and the propylene is 100 mol %).

(6) In the composition described in (1), the 1-butene.α-olefin copolymer (Y) preferably has a pentad isotacticity (mmmm) of not less than 80%.

(7) In the 1-butene.α-olefin copolymer composition described in (1), the ethylene polymer (X-2) is preferably one or more polymers selected from high-pressure low-density polyethylenes and linear low-density polyethylenes.

(8) In the 1-butene.α-olefin copolymer composition described in (5), it is preferable that the olefin polymer (X) be a propylene polymer (X-1) and the 1-butene.α-olefin copolymer (Y) be a 1-butene ethylene copolymer (Y-1).

(9) In the 1-butene.α-olefin copolymer composition described in (5), the 1-butene ethylene copolymer (Y-1) is preferably a 1-butene ethylene copolymer having an elution amount using o-dichlorobenzene at −10° C. of not more than 3 mass %.

(10) In the 1-butene.α-olefin copolymer composition described in (5), it is preferable that the olefin polymer (X)

be a propylene polymer (X-1) and the 1-butene.α-olefin copolymer (Y) be a 1-butene propylene copolymer (Y-2).

(11) In the 1-butene.α-olefin copolymer composition described in (5), the 1-butene propylene copolymer (Y-2) is preferably a 1-butene propylene copolymer having an elution amount using o-dichlorobenzene at −10° C. of not more than 3 mass %.

(12) In the 1-butene.α-olefin copolymer composition described in (5), it is preferable that the total amount of elution using o-dichlorobenzene at temperatures of not more than [Ts]° C. be 1.0 mass % to 5.0 mass % wherein [Ts] is characterized by the equation: [Ts]=[C4]−60 wherein [C4] is the proportion in mol % of 1-butene in the 1-butene propylene copolymer (Y-2).

(13) Another aspect of the invention resides in a 1-butene ethylene copolymer including 99.9 to 85 mol % of 1-butene and 0.1 to 15 mol % of ethylene (wherein the total of the 1-butene and the ethylene is 100 mol %) and having a molecular weight distribution (Mw/Mn) of 1.0 to 3.5.

(14) The 1-butene ethylene copolymer described in (13) preferably has an elution amount using o-dichlorobenzene at −10° C. of not more than 3 mass %.

(15) Another aspect of the invention resides in a 1-butene propylene copolymer including 99.9 to 70 mol % of 1-butene and 0.1 to 30 mol % of propylene (wherein the total of the 1-butene and the propylene is 100 mol %) and having a molecular weight distribution (Mw/Mn) of 1.0 to 3.5.

(16) The 1-butene propylene copolymer described in (15) preferably has an elution amount using o-dichlorobenzene at −10° C. of not more than 3 mass %.

(17) In the 1-butene propylene copolymer described in (15) or (16), it is preferable that the total amount of elution using o-dichlorobenzene at temperatures of not more than [Ts]° C. be 1.0 mass % to 5.0 mass % wherein [Ts] is characterized by the equation: [Ts]=[C4]−60 wherein [C4] is the proportion in mol % of 1-butene in the copolymer.

Advantageous Effects of Invention

When used in packaging films, the 1-butene.α-olefin copolymer compositions of the invention not only exhibit excellent low-temperature heat sealing properties but are free from stickiness. With the inventive compositions, it is possible to control the heat seal strength in a fixed range when heat sealing takes place at low temperatures, and also to reduce the change in heat seal strength with time. In the packaging applications, the invention makes it possible to easily control the strength required to open the packages in a fixed range, and also makes it possible to design high-performance packages.

DESCRIPTION OF EMBODIMENTS

Olefin Polymers (X)

Figure 1:
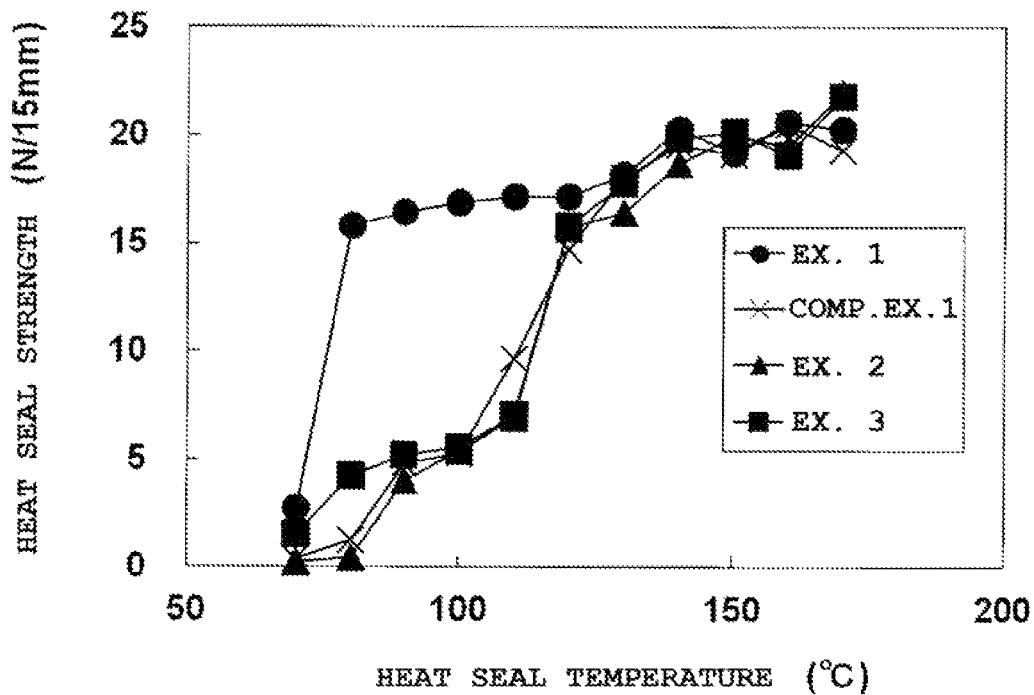
FIG. 1 is a view illustrating dependencies of heat seal strength on heat seal temperature in Examples.

The olefin polymer (X) is one of the components present in the inventive 1-butene.α-olefin copolymer composition. This polymer is at least one or more selected from propylene polymers (X-1) and/or ethylene polymers (X-2).

Propylene Polymers (X-1)

The propylene polymers (X-1) in the invention contain 50 mol % or more of propylene. Propylene homopolymers or copolymers containing 50 mol % or more of propylene may be used. Examples of the propylene copolymers include random copolymers and block copolymers. Examples of monomers copolymerized with propylene include α-olefins other than propylene. One or more such α-olefins may be used as required.

The lower limit of the proportion of propylene in the copolymer is 50 mol %, preferably 75 mol %, and more preferably 80 mol %, and the upper limit thereof is 100 mol %, preferably 99.5 mol %, and more preferably 99 mol %. The lower limit of the proportion of the α-olefin monomer(s) other than propylene is 0 mol %, preferably 0.5 mol %, and more preferably 1 mol %, and the upper limit thereof is 50 mol %, preferably 25 mol %, and more preferably 20 mol %. Examples of these proportions are such that the proportion of propylene is 50 to 100 mol %, preferably 75 to 99.5 mol %, and more preferably 80 to 99 mol %, and the proportion of the α-olefin(s) other than propylene is 0 to 50 mol %, preferably 0.5 to 25 mol %, and more preferably 1 to 20 mol % (wherein the total of the propylene and the α-olefin(s) other than propylene is 100 mol %).

Examples of the α-olefins to be copolymerized with propylene include α-olefins having 2 or 4 to 20 carbon atoms such as ethylene, 1-butene, 1-pentene, 3-methyl-1-butene, 4-methyl-1-pentene, 1-hexene, 1-octene, 1-decene, 1-dodecene and 1-tetradecene.

The MFR (measured at 230° C. under a load of 2.16 kg) of the propylene polymer (X-1) is not particularly limited as long as the 1-butene.α-olefin copolymer composition obtained by mixing the polymer with the 1-butene.α-olefin copolymer (Y) described later can be formed into films. However, the MFR is preferably 0.1 to 10 g/10 min, and particularly preferably 0.5 to 8 g/10 min. When MFR falls within these values, film formability is good. The melting point (Tm) is desirably 100° C. or above and is desirably 165° C. or below. In particular, the melting point is desirably from 120° C. to 150° C.

Specific examples of the propylene polymers (X-1) in the invention include propylene copolymers, propylene ethylene random copolymers, propylene 1-butene random copolymers, propylene 1-butene ethylene random copolymers, propylene 1-hexene random copolymers, propylene 3-methyl-1-butene random copolymers and propylene 4-methyl-1-pentene random copolymers. The propylene polymers (X-1) may be used singly, or two or more may be used. In particular, preferred polymers are random copolymers of propylene and at least one or more α-olefins selected from ethylene, propylene and α-olefins having 5 to 20 carbon atoms.

The propylene polymers (X-1) in the invention may be produced by any of various known production methods, for example, by polymerizing the monomer (s) by known polymerization methods such as gas-phase methods, bulk methods and slurry methods in the presence of known catalysts such as Ziegler-Natta catalysts and metallocene catalysts.

Ethylene Polymers (X-2)

The ethylene polymer (X-2) in the invention contains 50 mol % or more of ethylene. The ethylene polymer (X-2) may be an ethylene homopolymer or a copolymer containing 50 mol % or more of ethylene. Examples of the copolymers include random copolymers and block copolymers. A monomer copolymerized with ethylene is one or more α-olefins selected from α-olefins having 3 to 20 carbon atoms.

In the ethylene copolymers (X-2), in particular, in the case of ethylene.α-olefin copolymers, the lower limit of the proportion of ethylene is 50 mol %, preferably 75 mol %, and more preferably 90 mol %, and the upper limit thereof is 99.9 mol %, and preferably 99 mol %. The lower limit of the proportion of the α-olefin monomer(s) is 0.1 mol %, and preferably 1 mol %, and the upper limit thereof is 50 mol %, preferably 25 mol %, and more preferably 10 mol %. Examples of these proportions are such that the proportion of ethylene is 50 to 99.9 mol % and the proportion of the α-olefin (s) is 0.1 to 50 mol %, preferably such that the proportion of ethylene is 75 to 99.9 mol % and the proportion of the α-olefin(s) is 0.1 to 25 mol %, and more preferably such that the proportion of ethylene is 90 to 99 mol % and the proportion of the α-olefin(s) is 1 to 10 mol % (wherein the total of the ethylene and the α-olefin(s) is 100 mol %).

Specific examples of the ethylene polymers (X-2) in the invention include ethylene homopolymers and copolymers. The copolymer includes copolymers of ethylene with α-olefins having 3 to 20 carbon atoms, and preferably with α-olefins having 3 to 8 carbon atoms, and preferably includes random copolymers.

The MFR (measured at 190° C. under a load of 2.16 kg) of the ethylene polymer (X-2) in the invention is not particularly limited as long as the 1-butene.α-olefin copolymer composition obtained by mixing the polymer with the 1-butene.α-olefin copolymer (Y) described later can be formed into films. However, the MFR is preferably 0.1 to 50 g/10 min, and more preferably 0.1 to 20 g/10 min.

In the ethylene.α-olefin copolymers, examples of the α-olefins to be copolymerized with ethylene include α-olefins having 3 to 20 carbon atoms such as propylene, 1-butene, 1-pentene, 3-methyl-1-butene, 4-methyl-1-pentene, 1-hexene, 1-octene, 1-decene, 1-dodecene and 1-tetradecene.

Specific examples of the ethylene polymers (X-2) in the invention include high-pressure low-density polyethylenes, linear low-density polyethylenes such as ethylene propylene random copolymers, ethylene 1-butene random copolymers, ethylene 1-hexene random copolymers and ethylene 1-octene random copolymers, and high-density polyethylenes. The ethylene polymers (X-2) in the invention may be used singly, or two or more may be used.

The ethylene polymers (X-2) in the invention may be produced by any of various known production methods, for example, by so-called high-pressure polyethylene production methods or by polymerizing the monomer(s) by known polymerization methods such as gas-phase methods, bulk methods and slurry methods in the presence of known catalysts such as Ziegler-Natta catalysts and metallocene catalysts.

1-Butene.α-olefin copolymers (Y)

The 1-butene.α-olefin copolymer (Y) is one of the components present in the inventive 1-butene.α-olefin copolymer composition. This copolymer contains 99.9 to 70 mol % of 1-butene and 0.1 to 30 mol % of one or more α-olefins selected from ethylene, propylene and C5 to C12 α-olefins (wherein the total of the 1-butene and the one or more α-olefins selected from ethylene, propylene and C5 to C12 olefins is 100 mol %), and has a molecular weight distribution (Mw/Mn) of 1.0 to 3.5. Here, the α-olefins include 1-butene, and one or more α-olefins selected from ethylene, propylene and C5 to C12 olefins. Examples of the α-olefins having 5 to 12 carbon atoms include 1-pentene, 1-hexene, 1-octene and 1-decene.

Specific examples of the 1-butene.α-olefin copolymers (Y) in the invention include 1-butene ethylene copolymers (Y-1), 1-butene propylene copolymers (Y-2), 1-butene 1-pentene copolymers, 1-butene 1-hexene copolymers, 1-butene ethylene propylene copolymers, 1-butene ethylene 1-pentene copolymers, 1-butene propylene 1-pentene copolymers and 1-butene ethylene 1-hexene copolymers. Examples of the types of copolymers include block copolymers and random copolymers. Of these copolymers, random copolymers are preferable.

The 1-butene.α-olefin copolymer (Y) in the invention desirably has a pentad isotacticity of not less than 80%, preferably 85 to 95%, more preferably 88 to 94%, and still more preferably 88.0 to 93.0%. When pentad isotacticity falls within this range, forming properties and improvements in properties are good.

The pentad isotacticity (mmmm) of the 1-butene.α-olefin copolymer (Y) in the invention is defined as the structures in which five continuous 1-butene units have the side-chain ethyl groups on the same side, in the 1-butene.α-olefin copolymer (Y) assumed as having a zigzag extended chain. Assuming that these structures give rise to a peak with a peak top chemical shift of 27.50 ppm, the pentad isotacticity is calculated from the following equation wherein S is the area of the peak with a peak top at 27.50 ppm, and S' is the total area of peaks appearing in the range of 27.35 ppm to 26.30 ppm.

$$(mmmm)=S/(S+S')\times 100(\%)$$

Here, the main peaks appearing in the range of 27.35 ppm to 26.30 ppm are assigned to mmmr (27.35 ppm), mmrr and rmmr (27.15 ppm), and mrrm (26.32 ppm).

$^{13}$C-NMR spectrometry is performed with the following apparatus and under the following conditions.

The apparatus used is nuclear magnetic resonance apparatus ECP500 manufactured by JEOL Ltd. The solvent is an o-dichlorobenzene/deuterated benzene (volume ratio: 80/20) mixture solvent. The sample concentration is 50 mg/0.6 mL. The measurement temperature is 120° C. The nucleus observed is $^{13}$C (125 MHz). The sequence is single pulse proton decoupling. The pulse width is 4.7 μsec (45° pulse). The repetition time is 5.5 sec. The number of scans is at least 10,000. The reference chemical shift, 0 ppm, is the carbon signal of tetramethylsilane (TMS). In this case, the signal assigned to the methylene groups in the butene side chains is usually observed near 27.50 ppm.

In the 1-butene.α-olefin copolymer (Y) in the invention, it is preferable that the proportion of regioerrors by 4,1-insertions relative to all the 1-butene monomers be less than 0.1%. The 4,1-insertions of 1-butene monomers in the molecular chain may result in insufficient mechanical strength.

For example, the 4,1-insertions in the 1-butene.α-olefin copolymer (Y) in the invention may be identified in accordance with a method reported by V. Busico et al. in Macromol. Rapid. Comun., 16, 269 (1995). The proportion may be calculated from the following equation based on the peak intensities of the main chain γγ (31.1 ppm), the main chain αα (40.2 ppm) and the main chain αα' (39.6 ppm).

$$\text{(Content of 4,1-insertions)}=[I_{\gamma\gamma}/(I_{\alpha\alpha}+I_{\alpha\alpha'}+2\times I_{\gamma\gamma})]\times 100(\%)$$

In the above equation, $I_{\gamma\gamma}$, $I_{\alpha\alpha}$ and $I_{\alpha\alpha'}$ indicate the peak intensities of the main chain γγ (31.1 ppm), the main chain αα (40.2 ppm) and the main chain αα' (39.6 ppm), respectively.

[Chem. 1]

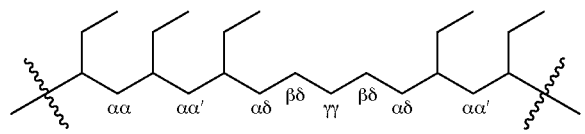

In the 1-butene.α-olefin copolymer (Y) in the invention, the melting point (Tm) measured with a differential scanning calorimeter (DSC) is preferably not less than 60° C., and is preferably not more than 120° C. The melting point (Tm) is measured by the following method. The melting point (Tm) measured by the following method is Tm-I.

The melting point of the 1-butene.α-olefin copolymer (Y) in the invention is measured in the following manner. With a differential scanning calorimeter (DSC), the copolymer is heated from room temperature (generally 23° C.) to 200° C. at a heating rate of 10° C./min. After being held at 200° C. for 5 minutes, the copolymer is cooled to room temperature at a cooling rate of 10° C./min and is allowed to stand at room temperature for approximately 10 days. Thereafter, the copolymer is cooled from room temperature to −50° C. at a cooling rate of 10° C./min and is held at −50° C. for 5 minutes. The sample is then heated from −50° C. to 200° C. at a heating rate of 10° C./min while recording a melting curve. Of the melting peaks recorded, the largest peak is obtained as the melting point (Tm-I).

In the 1-butene.α-olefin copolymer (Y) in the invention, the ratio of the weight average molecular weight (Mw) to the number average molecular weight (Mn), (Mw/Mn), measured by gel permeation chromatography (GPC) is such that the lower limit is 1.0 and the upper limit is 3.5. Further, the upper limit is preferably 3.0. Large values of Mw/Mn are disadvantageous for the polymer to exhibit mechanical properties such as toughness.

In the 1-butene.α-olefin copolymer (Y) in the invention, the lower limit of the weight average molecular weight (Mw) is preferably $2 \times 10^5$ and the upper limit thereof is preferably $7 \times 10^5$. More preferably, the lower limit is $3 \times 10^5$ and the upper limit is $6 \times 10^5$.

In the butene.α-olefin copolymer (Y) in the invention, the melt flow rate (MFR) (190° C., 2.16 kg) is preferably such that the lower limit is 0.1 g/10 min and the upper limit is 50 g/10 min. More preferably, the upper limit is 20 g/10 min. When melt flow rate falls within these range, film formability is good.

An elution amount of the butene.α-olefin copolymer (Y) in the invention preferably using o-dichlorobenzene at −10° C. of not more than 3 mass %, and more preferably not more than 2 mass %. A composition obtained by mixing the butene.α-olefin copolymer which has the above elution amount with the olefin polymer (X) exhibits still improved low-temperature heat sealing properties and also improved formability.

Preferred 1-butene.α-olefin copolymers (Y) in the invention are 1-butene ethylene copolymers (Y-1) and 1-butene propylene copolymers (Y-2).

1-Butene Ethylene Copolymers (Y-1)

The 1-butene ethylene copolymers (Y-1) in the invention preferably contain 1-butene at 99.9 to 85 mol %, and more preferably 99 to 95 mol %, and ethylene at 0.1 to 15 mol %, and more preferably 1 to 5 mol % (wherein the total of the 1-butene and the ethylene is 100 mol %).

In the 1-butene ethylene copolymers (Y-1) in the invention, the ratio of the weight average molecular weight (Mw) to the number average molecular weight (Mn), (Mw/Mn), measured by gel permeation chromatography (GPC) is such that the lower limit is 1.0 and the upper limit is 3.5. Further, the upper limit is preferably 2.5. Large values of Mw/Mn are disadvantageous for the polymer to exhibit mechanical properties such as toughness.

1-Butene Propylene Copolymers (Y-2)

The 1-butene propylene copolymers (Y-2) in the invention preferably contain 1-butene at 99.9 to 70 mol %, and more preferably 95 to 70 mol %, and propylene at 0.1 to 30 mol %, and more preferably 5 to 30 mol % (wherein the total of the 1-butene and the propylene is 100 mol %).

In the 1-butene propylene copolymers (Y-2) in the invention, it is preferable that the total elution amount (unit: mass %, hereinafter sometimes written as %) at temperatures of not more than [Ts]° C. be 1.0% to 5.0% wherein [Ts] is characterized by the equation:

$$[Ts]=[C4]-60.$$

[C4] is the proportion in mol % of 1-butene. This total elution amount is advantageous in that excellent effects are obtained not only in low-temperature heat sealing properties but also in formability in various applications described later.

When the propylene content in the 1-butene propylene copolymer (Y-2) in the invention is in the range of 0.1 to 20 mol %, it is desirable that the total elution amount at temperatures of not more than [Ts]° C. be 1.0 mass % to 5.0 mass %, preferably 1.0 to 4.5 mass %, and more preferably 2.5 to 4.5 mass % wherein [Ts] is characterized by the equation: [Ts]=[C4]−60 wherein [C4] is the proportion in mol % of 1-butene in the 1-butene propylene copolymer (Y-2).

When the propylene content in the 1-butene propylene copolymer (Y-2) is from more than 20 mol % to 30 mol %, the copolymer preferably satisfies [C4]−5>Tm-II, or the copolymer is preferably such that Tm-II is not substantially detected.

Here, Tm-II is measured in the following manner. With a differential scanning calorimeter (DSC), the copolymer is heated from room temperature (generally 23° C.) to 200° C. at a heating rate of 10° C./min. After being held at 200° C. for 5 minutes, the copolymer is cooled from 200° C. to 0° C. at a cooling rate of 20° C./min and is held at 0° C. for 5 minutes. Thereafter, the sample is heated from 0° C. to 200° C. at a heating rate of 20° C./min while recording a melting curve. The temperature corresponding to the largest peak of the melting peaks recorded is obtained as Tm-II.

Methods for Producing 1-Butene.α-Olefin Copolymers (Y)

For example, the 1-butene.α-olefin copolymers (Y) in the invention may be obtained by polymerizing the monomers by known polymerization methods such as gas-phase methods, bulk methods and slurry methods in the presence of catalysts such as Ziegler-Natta catalysts and metallocene catalysts. In particular, the copolymers are desirably produced by polymerization using a metallocene compound represented by General Formula (1) or (2) below.

[Chem. 2]

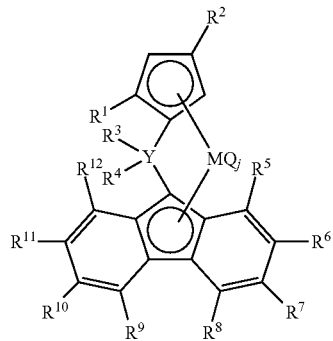

(1)

[Chem. 3]

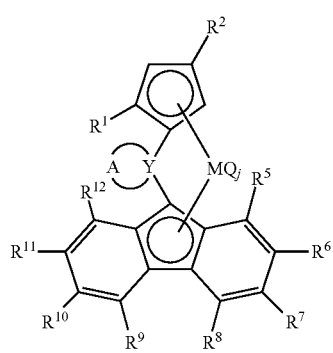

(2)

(In the formulae, $R^2$ is selected from hydrocarbon groups and silicon-containing hydrocarbon groups; $R^1$, $R^3$, $R^4$, $R^5$, $R^6$, $R^7$, $R^8$, $R^9$, $R^{10}$, $R^{11}$ and $R^{12}$ are selected from hydrogen, hydrocarbon groups and silicon-containing hydrocarbon groups, and may be the same or different from one another; adjacent substituents of $R^5$ to $R^{12}$ may be bonded to each other to form a ring; A is a divalent hydrocarbon group of 2 to 20 carbon atoms which may include a partially unsaturated bond and/or an aromatic ring; A may include two or more ring structures including the ring formed between A and Y; M is a metal selected from Group IV of the periodic table; Y is carbon or silicon; Q is a halogen, a hydrocarbon group, an anionic ligand or a neutral ligand capable of coordination via a lone pair of electrons, and may be the same or different when plural; and j is an integer of 1 to 4.)

In General Formula (1) or (2), $R^1$, $R^3$, $R^4$, $R^5$, $R^6$, $R^7$, $R^8$, $R^9$, $R^{10}$, $R^{11}$ and $R^{12}$ are selected from hydrogen, hydrocarbon groups and silicon-containing hydrocarbon groups, and may be the same or different from one another.

Preferred hydrocarbon groups are alkyl groups of 1 to 20 carbon atoms, arylalkyl groups of 7 to 20 carbon atoms, aryl groups of 6 to 20 carbon atoms, and alkylaryl groups of 7 to 20 carbon atoms. The hydrocarbon groups may include one or more ring structures. Specific examples thereof include methyl, ethyl, n-propyl, isopropyl, 2-methylpropyl, 1,1-dimethylpropyl, 2,2-dimethylpropyl, 1,1-diethylpropyl, 1-ethyl-1-methylpropyl, 1,1,2,2-tetramethylpropyl, sec-butyl and tert-butyl.

Preferred silicon-containing hydrocarbon groups are alkylsilyl groups and arylsilyl groups having 1 to 4 silicon atoms and 3 to 20 carbon atoms. Specific examples thereof include trimethylsilyl, tert-butyldimethylsilyl and triphenylsilyl.

Preferably, $R^2$ is a sterically bulky hydrocarbon group or silicon-containing hydrocarbon group, namely, a secondary or tertiary substituent, and is more preferably a substituent having 4 or more carbon atoms. Specific examples of the hydrocarbon groups include isopropyl, 1,1-dimethylpropyl, 1,1-diethylpropyl, 1-ethyl-1-methylpropyl, 1,1,2,2-tetramethylpropyl, sec-butyl, tert-butyl and 1,1-dimethylbutyl. Tert-butyl is particularly preferable. Examples of the silicon-containing hydrocarbon groups include compounds corresponding to the above compounds except that part or all of the carbon atoms are replaced by silicon atoms.

The adjacent substituents of $R^5$ to $R^{12}$ on the fluorene ring may be bonded together to form rings. Examples of such substituted fluorenyl groups include benzofluorenyl and dibenzofluorenyl. For easy synthesis, the substituents $R^5$ to $R^{12}$ on the fluorene ring are preferably symmetric, namely, $R^5=R^{12}$, $R^6=R^{11}$, $R^7=R^{10}$, and $R^8=R^9$. More preferred structures are unsubstituted fluorene, 3,6-disubstituted fluorene, 2,7-disubstituted fluorene and 2,3,6,7-tetrasubstituted fluorene. Here, the 3-position, the 6-position, the 2-position and the 7-position on the fluorene ring correspond to $R^7$, $R^{10}$, $R^6$ and $R^{11}$, respectively.

In General Formula (1), $R^3$ and $R^4$ are selected from hydrogen, hydrocarbon groups and silicon-containing hydrocarbon groups, and may be the same or different from each other. Specific examples of the preferred hydrocarbon groups include those mentioned hereinabove. Y is carbon or silicon. In the case of General Formula (1), $R^3$ and $R^4$ are bonded to Y to form a substituted methylene group or a substituted silylene group as a bridge. Specific examples of preferred structures include methylene, dimethylmethylene, diisopropylmethylene, methyl-tert-butylmethylene, dicyclohexylmethylene, methylcyclohexylmethylene, methylphenylmethylene, diphenylmethylene, dimethylsilylene and diisopropylsilylene. More preferably, Y is carbon.

When $R^2$ in General Formula (1) or (2) is a tert-butyl group, $R^1$ is preferably a methyl or ethyl group, and is preferably a methyl group. In this case, $R^3$ and $R^4$ in General Formula (1) are methyl or phenyl groups, and are preferably methyl groups. Further, $R^3$ and $R^4$ are preferably the same as each other. When $R^2$ and $R^1$ in General Formula (1) are a tert-butyl group and a methyl group, respectively, $R^5$ to $R^{12}$ may be hydrogen.

Preferred compounds are such that when $R^2$ and $R^1$ in General Formula (1) are a tert-butyl group and an ethyl group, respectively, $R^5$, $R^7$, $R^8$, $R^9$, $R^{10}$ and $R^{12}$ are hydrogen, and $R^6$ and $R^{11}$ are tert-butyl groups.

In General Formula (2), Y is bonded to the divalent hydrocarbon group A of 2 to 20 carbon atoms which may include a partially unsaturated bond and/or an aromatic ring, thereby forming a structure such as a cycloalkylidene group or a cyclomethylenesilylene group. Specific examples of preferred structures include cyclopropylidene, cyclobutylidene, cyclopentylidene and cyclohexylidene.

In General Formulae (1) and (2), M is a metal selected from Group IV in the periodic table, with examples of M including titanium, zirconium and hafnium. Q is a halogen, a hydrocarbon group of 1 to 20 carbon atoms, an anionic ligand or a neutral ligand capable of coordination via a lone pair of electrons, and may be the same or different when plural. Specific examples of the halogens include fluorine, chlorine, bromine and iodine. Specific examples of the hydrocarbon groups include those mentioned hereinabove. Specific examples of the anionic ligands include alkoxy groups such as methoxy, tert-butoxy and phenoxy; carboxylate groups such as acetate and benzoate; and sulfonate groups such as mesylate and tosylate. Specific examples of the neutral ligands capable of coordination via lone-pair electrons include organophosphorus compounds such as trimethylphosphine, triethylphosphine, triphenylphosphine and diphenylmethylphosphine; and ethers such as tetrahydrofuran, diethylether, dioxane and 1,2-dimethoxyethane. When plural, Qs may be the same or different, but it is preferable that at least one be a halogen or an alkyl group.

A component (B) is any of organoaluminum oxy-compounds (B-1), compounds (B-2) capable of reacting with the metallocene compound (A) to form an ion pair, and at least one compound (B-3) selected from organoaluminum compounds. Further, a particulate carrier (C) is used as required.

The organoaluminum oxy-compounds (B-1) may be any known aluminoxanes.

Examples of the compounds (B-2) capable of reacting with the metallocene compound (A) to form an ion pair (hereinafter, sometimes referred to as the "ionic compounds") include Lewis acids, ionic compounds, borane compounds and carborane compounds described in literature such as JP-A-H01-501950 and JP-A-2004-51676. Heteropoly compounds and isopoly compounds are also usable.

Specific examples include triphenylboron, tris(o-tolyl)boron, tris(p-tolyl)boron, tris(3,5-dimethylphenyl)boron, trimethylboron, triisobutylboron; compounds having a haloaryl group such as compounds having a fluoroaryl group, for example, tris(4-fluorophenyl)boron, tris(3,5-difluorophenyl)boron, tris(4-fluoromethylphenyl)boron and tris(pentafluorophenyl)boron; and trifluoroboron.

Examples of the organoaluminum compounds (B-3) that are the components of the olefin polymerization catalysts include organoaluminum compounds represented by General Formula (6) below.

[Chem. 4]

$$R^a{}_m Al(OR^b)H_p X_q \tag{6}$$

(In the formula, $R^a$ and $R^b$ may be the same or different from each other and indicate hydrocarbon groups having 1 to 15, and preferably 1 to 4 carbon atoms; X is a halogen atom; m is $0 < m \leq 3$; n is $0 \leq n < 3$; p is $0 \leq p < 3$; q is $0 \leq q < 3$; and $m+n+p+q=3$.) Specific examples of such organoaluminum compounds include trimethylaluminum, triethylaluminum, tri-n-butylaluminum, dialkylaluminum hydrides such as diisopropylaluminum hydride and diisobutylaluminum hydride, and alkylaluminum alkoxides such as isobutylaluminum methoxide and isobutylaluminum ethoxide.

Preferred organoaluminum compounds (B-3) include tri-n-alkylaluminums such as trimethylaluminum, triethylaluminum and trioctylaluminum, and tri-branched alkylaluminums such as triisobutylaluminum. In particular, trimethylaluminum and triisobutylaluminum are preferably used.

In the invention, the 1-butene.α-olefin copolymer may be produced by any of liquid-phase polymerization methods such as solution polymerization and suspension polymerization, and gas-phase polymerization methods. In the liquid-phase polymerization methods, inert hydrocarbon solvents may be used. Specific examples include aliphatic hydrocarbons such as propane, butane, pentane, hexane, heptane, octane and decane; alicyclic hydrocarbons such as cyclopentane, cyclohexane and methylcyclopentane; aromatic hydrocarbons such as benzene, toluene and xylene; and mixtures of these solvents. Bulk polymerization may be performed in which the olefins including 1-butene themselves are used as the solvent.

In the production of the 1-butene.α-olefin copolymer (Y) in the invention, so-called multistage polymerization may be adopted in which polymerization conditions are changed in a stepwise manner. For example, a 1-butene.α-olefin copolymer (Y) having various molecular weight distributions may be obtained by performing polymerization stepwise under two conditions with different hydrogen supply rates. Further, a 1-butene.α-olefin copolymer (Y) with a controlled composition distribution may be obtained by performing the homopolymerization of 1-butene and the copolymerization of 1-butene and another olefin in a stepwise manner.

In the polymerization, the component (A) is usually used in an amount of $10^{-8}$ to $10^{-2}$ mol, and preferably $10^{-7}$ to $10^{-3}$ mol in terms of the Group IV metal atom in the periodic table, per liter of the reaction volume. The component (B-1) is usually used in such an amount that the molar ratio of the component (B-1) to the transition metal atom (M) in the component (A) [(B-1)/M] is 0.01 to 5000, and preferably 0.05 to 2000. The component (B-2) is usually used in such an amount that the molar ratio of the component (B-2) to the transition metal atom (M) in the component (A) [(B-2)/M] is 1 to 10, and preferably 1 to 5. The component (B-3) is usually used in such an amount that the molar ratio of the component (B-3) to the transition metal atom (M) in the component (A) [(B-2)/M] is 10 to 5000, and preferably 20 to 2000.

The polymerization temperature is usually in the range of −50 to 200° C., preferably 0 to 100° C., and more preferably 20 to 100° C. Excessively low polymerization temperatures tend to be disadvantageous in industry in view of aspects such as polymerization activity per unit amount of catalyst, and heat recovery efficiency.

The polymerization pressure is usually from normal pressure to 10 MPa gauge pressure, and preferably from normal pressure to 5 MPa gauge pressure. The polymerization reaction may be carried out batchwise, semi-continuously or continuously. The polymerization may be carried out in two or more stages under different reaction conditions.

Hydrogen may be added in order to control the molecular weight of the 1-butene.α-olefin copolymer produced by the polymerization as well as to control polymerization activity. The amount of hydrogen is appropriately about 0.001 to 100 NL per kg of the olefins.

1-Butene.α-Olefin Copolymer Compositions

The 1-butene.α-olefin copolymer composition of the invention includes the olefin polymer (X) in an amount of 99 to 1 parts by mass, preferably 95 to 10 parts by mass, more preferably 92.5 to 30 parts by mass, and still more preferably 92.5 to 55 parts by mass, and the 1-butene.α-olefin copolymer (Y) in an amount of 1 to 99 parts by mass, preferably 5 to 90 parts by mass, more preferably 7.5 to 70 parts by mass, and still more preferably 7.5 to 45 parts by mass [(X)+(Y)=100 parts by mass].

The MFR (190° C., 2.16 kg load) of the 1-butene.α-olefin copolymer composition of the invention is not particularly limited as long as the composition can be formed into films. However, the lower limit thereof is preferably 0.1 g/10 min, and the upper limit thereof is preferably 50 g/10 min. More preferably, the upper limit is 20 g/10 min.

The melt flow rate (MFR) (190° C., 2.16 kg) of the butene.α-olefin copolymer (Y) in the invention is preferably such that the lower limit thereof is 0.1 g/10 min and the upper limit thereof is 50 g/10 min. More preferably, the upper limit is 20 g/10 min. When MER falls within this range, film formability is good.

The 1-butene.α-olefin copolymer composition of the invention, or the olefin polymer (X) and the 1-butene.α-olefin copolymer (Y) may contain usual additives such as antioxidants, weather stabilizers, antistatic agents and anti-fogging agents, or polymers as required while still achieving the object of the invention. By the addition of anti-blocking agents and slip agents, the composition of the invention may achieve improvements in properties such as processability and workability when the composition is formed into heat seal layers, is laminated, or is heat sealed to package an item.

The 1-butene.α-olefin copolymer composition of the invention is used in various forms such as films. In particular, the 1-butene.α-olefin copolymer composition of the invention is suited for lamination onto bases such as films. That is, the inventive composition may be laminated onto various films to produce stacked films. Layers formed of the inventive 1-butene.α-olefin copolymer composition are useful as heat seal layers. Further, layers formed of the inventive 1-butene.α-olefin copolymer composition may be used as easy peel layers.

Preferred examples of the 1-butene.α-olefin copolymer compositions of the invention include compositions in which the olefin polymer (X) is the propylene polymer (X-1) and/or the ethylene polymer (X-2), compositions in which the 1-butene.α-olefin copolymer (Y) is the 1-butene ethylene copolymer (Y-1) or the 1-butene propylene copolymer (Y-2), compositions which include the propylene polymer (X-1) and the 1-butene ethylene copolymer (Y-1) or the 1-butene propylene copolymer (Y-2), and compositions which include the ethylene polymer (X-2) and the 1-butene ethylene copolymer (Y-1) or the 1-butene propylene copolymer (Y-2).

The 1-butene.α-olefin copolymer compositions of the invention which include the propylene polymer (X-1) as the olefin polymer (X) are suited as heat seal layers for various films such as polypropylene. Such heat seal layers are used in the form of multilayer films by being stacked onto films such as polypropylene by methods such as lamination. Layers formed of the inventive compositions are particularly useful as heat seal layers.

Heat seal layers formed of the inventive composition including the propylene polymer (X-1) are excellent in the balance between low-temperature fusion bonding properties and anti-blocking properties, and are characterized by the capability of attaining a fixed range of heat seal strength in a relatively wide range of acceptable heating temperatures during heat sealing (heat seal temperatures). Thus, such heat seal layers are advantageous in that a higher degree of freedom may be obtained in controlling the heat seal temperature in the packaging of items with use of the heat seal layers.

Layers (base layers) on which the heat seal layers formed of the inventive composition containing the propylene polymer (X-1) are stacked may be any of various materials usually used as packaging materials. Examples thereof include polyolefin films such as polypropylene films, polyethylene films, polybutene films and polymethylpentene films, polyester films such as polyethylene terephthalates and polycarbonates, thermoplastic resin films such as nylon films, polystyrene films, polyvinyl chloride films, polyvinylidene chloride films, polyvinyl alcohol films and ethylene vinyl alcohol copolymer films, aluminum films and paper. These layers (base layers) may be unstretched films, or may be stretched films such as uniaxially stretched films and biaxially stretched films.

Examples of the stacked films include two-layered structures such as heat seal layer (inventive composition layer)/base layer, and three-layered structures such as heat seal layer (inventive composition layer)/base layer/heat seal layer (inventive composition layer). Adhesive layers may be disposed between the heat seal layer and the base layer. However, when the inventive composition according to the present aspect is used for heat seal, the composition exhibits good fusion bonding properties with respect to polyolefin resins, and consequently heat sealing results in excellent heat seal strength even in the absence of an adhesive layer.

Of the base layers, unstretched or stretched polyolefin films, in particular, polypropylene films have excellent performance. Multilayer films including these base layers show excellent balance between low-temperature heat sealing properties and anti-blocking properties by using properties of the base layers. For example, stretching conditions may be such that the films are uniaxially stretched at a stretch ratio of about 2 to 10 times, or are biaxially stretched at a stretch ratio of about 2 to 10 times in each direction.

Heat seal layers formed of the inventive composition containing the propylene polymer (X-1) are usually 1 μm to 20 μm, and preferably 2 μm to 10 μm. One, or two or more other layers (base layers) may be provided, and are generally 10 to 1000 μm. Where necessary, intermediate layers may be disposed to improve properties such as adhesion.

Multilayer films which have heat seal layers formed of the inventive composition containing the propylene polymer (X-1) may be produced by any of various known methods. For example, a heat seal layer, a base layer and optionally a film for an intermediate layer may be separately formed beforehand and stacked together. Alternatively, components such as resins for the respective layers may be separately melted in extruders and extruded through a single die so as to stack the layers into multilayer films by a method such as blown-film extrusion, air-cooled two-stage blown-film extrusion or T-die film extrusion. Still alternatively, multilayer films may be formed by stacking the respective layers by a method such as extrusion lamination.

Further, the inventive composition including the propylene polymer (X-1) not only exhibits excellent low-temperature heat sealing properties but is free from tackiness and excellent in transparency, anti-blocking properties, appearance and film formability. With the composition, it is possible to control the heat seal strength in a fixed range when heat sealing takes place at low temperatures, and also to reduce the change in heat seal strength with time. In the packaging applications, the strength required to open the packages may be easily controlled within a certain definite range, and high-performance packages may be designed.

Multilayer films which have layers formed of the inventive composition containing the propylene polymer (X-1) may be used as various packages and may be subjected to processing such as printing on the surface of the base layers as required. For example, packages produced from the multilayer films may accommodate various items such as bread, sweets, snacks, toys, stationary and miscellaneous goods in a sealed condition.

In packaging, the heat seal layer sides of the multilayer film are brought into contact with each other, and the superposed portions are heat sealed by various heat seal techniques. Exemplary techniques include fusion bonding with a heat seal bar, and sealing by fusing (fusion cutting). Appropriate heat seal strength is required such that the heat seals do not become separated during storage or transportation of the packages but may be easily opened by pulling for the taking out of the packaged items. The heat seal layers formed of the composition according to the present aspect may achieve various and appropriate levels of heat seal strength depending on the heat seal temperatures. By virtue of this characteristic, the package may be heat sealed with varied heat seal strengths from portion to portion. Therefore, the heat seal layers can be used in the above applications.

The 1-butene.α-olefin copolymer compositions of the invention which include the ethylene polymer (X-2) as the olefin polymer (X) may be used as heat seal layers as described above, but are particularly useful as easy peel sealants. That is, films may be designed such that the heat seals of packages may be opened by an appropriate pulling force without causing the breakage of the packaging films. Therefore, taking out of the packaged items from the packages and packaging the items can be repeated by using the easy peel sealants. Such packaging is advantageous also from the environmental protection viewpoint.

The inventive composition including the ethylene polymer (X-2) may be laminated onto various films similarly as described in the formation of the heat seal layers. In this case, the layers of the composition according to the present aspect serve as easy peel sealants, and the heat seal strength between the sealant and the base layer may be such that the heat seal does not become separated during storage or transportation of the package but may be opened by an appropriate force applied for the taking out of the packaged item.

Further, pealed surface of the layer has small changes for example surface roughness in its. And the layer has excellent design and ornament properties.

The inventive composition including the ethylene polymer (X-2) may be formed in the same manner as the heat seal layers, may be formed into stacked films and may be used in similar applications.

EXAMPLES

The present invention will be described based on Examples hereinbelow. However, the scope of the invention is not limited to such Examples. Properties were evaluated in the following manner.

[Intrinsic viscosity ([η])](unit dl/g)

The intrinsic viscosity was measured in a decalin solvent at 135° C.

[$^{13}$C-NMR]

Nuclear magnetic resonance apparatus ECP500 manufactured by JEOL Ltd. was used. The solvent was an o-dichlorobenzene/deuterated benzene (80/20 vol %) mixture solvent. The sample concentration was 55 mg/0.6 mL. The measurement temperature was 120° C. The nucleus observed was $^{13}$C (125 MHz). The sequence was single pulse proton decoupling. The pulse width was 4.7 μsec (45° pulse). The repetition time was 5.5 sec. The number of scans was at least 10,000. The reference chemical shift was 27.50 ppm.

[Pentad Isotacticity (Mmmm)]

Assuming that a pentad represented by mmmm would give rise to a peak with a peak top chemical shift of 27.5 ppm, the pentad isotacticity (mmmm) was calculated from the following equation wherein S was the area of the peak with a peak top at 27.5 ppm, and S' was the total area of peaks appearing in the range of 27.3 ppm to 26.3 ppm. (The detection limit was 0.010.)

$$(mmmm)=S/(S+S')\times 100(\%)$$

Here, the main peaks appearing in the range of 27.3 ppm to 26.3 ppm were assigned to mmmr (27.3 ppm), mmrr and rmmr (27.2 ppm), and mrrm (26.3 ppm).

[Proportion of Regioerrors by 4,1-Insertions (Content of 4,1-Insertions)](Unit %)

The proportion of regioerrors by 4,1-insertions, namely, the content of 4,1-insertions was calculated from the following equation based on the peak intensities of the main chain γγ (31.1 ppm), the main chain αα (40.2 ppm) and the main chain αα (39.6 ppm) in a $^{13}$C-NMR spectrum.

$$(\text{Content of 4,1-insertions})=[I\gamma\gamma/(I\alpha\alpha+I\alpha\alpha'+2\times I\gamma\gamma)]\times 100(\%)$$

In the above equation, Iγγ, Iαα and Iαα' indicate the peak intensities of the main chain γγ (31.1 ppm), the main chain αα (40.2 ppm) and the main chain αα' (39.6 ppm), respectively.

[Chem. 5]

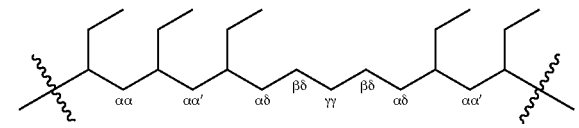

[Melting Points (Tm-I) and (Tm-II) of Polymer] (Unit ° C.)

The melting point (Tm) of the polymer was measured with differential scanning calorimeter (DSC) DSC220C manufactured by Seiko Instruments Inc. A 7-12 mg sample obtained from the polymerization was packed into an aluminum pan and was heated from room temperature to 200° C. at a heating temperature of 10° C./min. After being held at 200° C. for 5 minutes, the polymer was cooled from 200° C. to 0° C. at a cooling rate of 20° C./min and was held at 0° C. for 5 minutes. Thereafter, the sample was heated from 0° C. to 200° C. at a heating rate of 20° C./min while recording a melting curve. The temperature corresponding to the largest peak of the melting peaks recorded was obtained as Tm-II.

Thereafter, the sample was continuously held at 200° C. for 5 minutes and was cooled to room temperature at a cooling rate of 10° C./min. The sample in the aluminum pan was allowed to stand at room temperature for 10 days. Thereafter, the polymer was cooled from room temperature to −50° C. at a cooling rate of 10° C./min and was held at −50° C. for 5 minutes. The sample was then heated from −50° C. to 200° C. at a heating rate of 10° C./min while recording a melting curve. The temperature corresponding to the largest peak of the melting peaks recorded was obtained as Tm-I.

[Molecular Weight Distribution] (Mw/Mn) (Unit-)

Liquid chromatograph: ALC/GPC150-C plus (integral with a differential refractive index detector) manufactured by Waters Columns: Two GMH6-HT columns and two GMH6-GMH6-HTL columns manufactured by TOSOH CORPORATION were connected in series.

Mobile phase medium: o-dichlorobenzene

Flow rate: 1.0 ml/min

Measurement temperature: 140° C.

Preparation of a calibration curve: using standard polystyrene samples

Sample concentration: 0.10% (w/w)

Amount of sample solution: 500 μl

The obtained chromatogram was analyzed by a known method to calculate Mw/Mn and Mz/Mw. The measurement time per sample was 60 minutes.

(5) Total Elution Amount (Unit Wt %)

Cross-fractionation chromatography (CFC) was performed under the following conditions. The content of components dissolved in the solvent was obtained as the total elution amount. (The detection limit was 0.1%.)

Apparatus: cross-fractionation chromatograph CFC2 (manufactured by Polymer ChAR)
Detector: infrared spectrophotometer IR4 (manufactured by Polymer ChAR)
GPC columns: three Shodex HT-806M columns (manufactured by Showa Denko K.K.)
GPC column temperature: 140° C.
Column component: monodispersed polystyrene standard sample (manufactured by TOSOH CORPORATION)
Eluting solution: o-dichlorobenzene
Flow rate: 1.0 ml/min
Sample concentration: 120 mg/30 ml
Amount of injection: 500 μl
Cooling time: 160 minutes (140° C. to −20° C., 1° C./min)
Eluting temperatures: 45 fractions Polymerization Example 1

1-Butene propylene random copolymer (BPR-1)

Into a 300 L volume continuous polymerizer, n-hexane was supplied through an inlet port at a rate of 9.7 L/h. Through another inlet port, a mixed hexane solution which included isopropylidene (3-tert-butyl-5-methylcyclopentadienyl-fluor enyl)zirconium dichloride (main catalyst 1), a modified methylaluminoxane and triisobutylaluminum (concentration of the main catalyst 1 in terms of zirconium: 0.5 mmol/L, concentration of the modified methylaluminoxane in terms of aluminum: 125 mmol/L, triisobutylaluminum) was continuously supplied at a rate of 0.3 L/h (total supply of hexane: 10 L/h). At the same time, 44.4 kg/h of 1-butene, 10 kg/h of propylene and 11 NL/h of hydrogen were continuously supplied through other inlet ports of the polymerizer. Continuous solution polymerization was performed at a polymerization temperature of 65° C. and a total pressure of 1.2 MPaG with a residence time of 0.9 hours.

The hexane solution of 1-butene propylene random copolymer formed in the polymerizer was heated to remove hexane.

As a result, a 1-butene propylene random copolymer was obtained at a production speed of 10.3 kg/h. In the polymerization of the 1-butene propylene random copolymer, the polymerization mileage was 69 kg/mmol-Zr. The 1-butene propylene random copolymer obtained had an MFR (190° C., 2.16 kgf) of 4.0 g/10 min and a propylene content of 26.1 mol %.

Polymerization Example 2

1-Butene propylene random copolymer (BPR-2)

Into a 300 L volume continuous polymerizer, n-hexane was supplied through an inlet port at a rate of 19.8 L/h. Through another inlet port, a mixed hexane solution which included isopropylidene (3-tert-butyl-5-methylcyclopentadienyl-fluor enyl)zirconium dichloride (main catalyst 1), a modified methylaluminoxane and triisobutylaluminum (concentration of the main catalyst 1 in terms of zirconium: 0.5 mmol/L, concentration of the modified methylaluminoxane in terms of aluminum: 125 mmol/L triisobutylaluminum) was continuously supplied at a rate of 0.22 L/h (total supply of hexane: 20 L/h). At the same time, 25.1 kg/h of 1-butene, 2.5 kg/h of propylene and 10 NL/h of hydrogen were continuously supplied through other inlet ports of the polymerizer. Continuous solution polymerization was performed at a polymerization temperature of 60° C. and a total pressure of 0.69 MPaG with a residence time of 1.5 hours.

The hexane solution of 1-butene propylene random copolymer formed in the polymerizer was heated to remove hexane.

As a result, a 1-butene propylene random copolymer was obtained at a production speed of 7.9 kg/h. In the polymerization of the 1-butene propylene copolymer, the polymerization mileage was 72 kg/mmol-Zr. The 1-butene propylene random copolymer obtained had an MFR (190° C., 2.16 kgf) of 3.4 g/10 min and a propylene content of 13.3 mol %.

Polymerization Example 3

1-Butene propylene random copolymer (BPR-3)

Into a 300 L volume continuous polymerizer, n-hexane was supplied through an inlet port at a rate of 19.8 L/h. Through another inlet port, a mixed hexane solution which included diphenylmethylene (2,7-di-tert-butylfluoren-9-yl)(3-tert-butyl-5-ethylcyclopentadien-1-yl) zirconium dichloride (main catalyst 2), a modified methylaluminoxane and triisobutylaluminum (concentration of the main catalyst 2 in terms of zirconium: 0.5 mmol/L, concentration of the modified methylaluminoxane in terms of aluminum: 125 mmol/L, concentration of triisobutylaluminum in terms of aluminum: 100 mmol/L) was continuously supplied at a rate of 0.23 L/h (total supply of hexane: 20 L/h). At the same time, 25.1 kg/h of 1-butene, 2.2 kg/h of propylene and 14.0 NL/h of hydrogen were continuously supplied through other inlet ports of the polymerizer. Continuous solution polymerization was performed at a polymerization temperature of 50° C. and a total pressure of 0.59 MPaG with a residence time of 1.6 hours.

The hexane solution of 1-butene propylene random copolymer formed in the polymerizer was heated to remove hexane.

As a result, a 1-butene propylene random copolymer was obtained at a production speed of 8.2 kg/h. In the polymerization of the 1-butene propylene random copolymer, the polymerization mileage was 71 kg/mmol-Zr. The 1-butene propylene random copolymer obtained had an MFR (190° C., 2.16 kgf) of 4.1 g/10 min and a propylene content of 12.9 mol %.

Polymerization Example 4

1-Butene ethylene random copolymer (BER-1)

Into a 300 L volume continuous polymerizer, n-hexane was supplied through an inlet port at a rate of 9.8 L/h. Through another inlet port, a mixed hexane solution which included isopropylidene (3-tert-butyl-5-methylcyclopentadienyl-fluor enyl)zirconium dichloride (main catalyst 1), a modified methylaluminoxane and triisobutylaluminum (concentration of the main catalyst 1 in terms of zirconium: 0.5 mmol/L, concentration of the modified methylaluminoxane in terms of aluminum: 125 mmol/L, concentration of triisobutylaluminum in terms of aluminum: 100 mmol/L) was continuously supplied at a rate of 0.2 L/h (total supply of hexane: 10 L/h). At the same time, 44.9 kg/h of 1-butene, 0.11 kg/h of ethylene and 3.0 NL/h of hydrogen were continuously supplied through other inlet ports of the polymerizer. Continuous solution polymerization was performed at a polymerization temperature of 55° C. and a total pressure of 0.65 MPaG with a residence time of 1 hour.

The hexane solution of 1-butene ethylene random copolymer formed in the polymerizer was heated to remove hexane.

As a result, a 1-butene ethylene random copolymer was obtained at a production speed of 8.0 kg/h. In the polymerization of the 1-butene ethylene copolymer, the polymerization mileage was 80 kg/mmol-Zr. The 1-butene ethylene random copolymer obtained had an MFR (190° C., 2.16 kgf) of 0.8 g/10 min and an ethylene content of 1.5 mol %.

Polymerization Example 5

1-Butene ethylene random copolymer (BER-2)

Into a 300 L volume continuous polymerizer, n-hexane was supplied through an inlet port at a rate of 9.7 L/h. Through another inlet port, a mixed hexane solution which included isopropylidene (3-tert-butyl-5-methylcyclopentadienyl-fluorenyl)zirconium dichloride (main catalyst 1), a modified methylaluminoxane and triisobutylaluminum (concentration of the main catalyst 1 in terms of zirconium: 0.5 mmol/L, concentration of the modified methylaluminoxane in terms of aluminum: 125 mmol/L, concentration of triisobutylaluminum in terms of aluminum: 100 mmol/L) was continuously supplied at a rate of 0.26 L/h (total supply of hexane: 10 L/h). At the same time, 44.8 kg/h of 1-butene, 0.16 kg/h of ethylene and 10 NL/h of hydrogen were continuously supplied through other inlet ports of the polymerizer. Continuous solution polymerization was performed at a polymerization temperature of 65° C. and a total pressure of 0.65 MPaG with a residence time of 1 hour.

The hexane solution of 1-butene ethylene random copolymer formed in the polymerizer was heated to remove hexane.

As a result, a 1-butene ethylene random copolymer was obtained at a production speed of 8.0 kg/h. In the polymerization of the 1-butene ethylene random copolymer, the polymerization mileage was 55 kg/mmol-Zr. The 1-butene ethylene random copolymer obtained had an MFR (190° C., 2.16 kgf) of 3.9 g/10 min and an ethylene content of 2.5 mol %.

The studies here involved the copolymers prepared above, and 1-butene propylene random copolymer (BPR-A), 1-butene ethylene random copolymer (BER-A) and 1-butene ethylene random copolymer (BER-B) obtained with conventional titanium catalysts instead of the catalysts used in Polymerization Examples above.

Properties of these polymers are described in Table 1-1, Table 1-2 and Table 1-3.

BPR-1: butene-1 propylene random copolymer: no Tm-II detected
BPR-2: butene-1 propylene random copolymer
BPR-3: butene-1 propylene random copolymer
BER-1: butene-1 ethylene random copolymer
BER-2: butene-1 ethylene random copolymer
BPR-A: butene-1 propylene random copolymer
BER-A: butene-1 ethylene random copolymer
BER-B: butene-1 ethylene random copolymer In addition to the above BPR and BER polymers, Examples and Comparative Examples involved the following polymers.

LDPE-1: high-pressure low-density polyethylene; MFR (190° C.)=1 g/10 min, density=922 kg/m$^3$.
LDPE-2: high-pressure low-density polyethylene; MFR (190° C.)=4.7 g/10 min, Tm=108° C.
LLDPE: linear low-density polyethylene (ethylene butene-1 copolymer); MFR (190° C.)=2.0 g/10 min, Tm=117° C., density=919 kg/m$^3$.
PP-1: propylene ethylene 1-butene random copolymer; MFR (230° C.)=7 g/10 min, Tm=138° C., ethylene content=2.2 mol %, 1-butene content=1.5 mol %.
PP-2: propylene ethylene 1-butene random copolymer; MFR (230° C.)=5.5 g/10 min, Tm=131° C., ethylene content=9.5 mol %, 1-butene content=3.9 mol %.
PP-3: propylene ethylene 1-butene random copolymer; MFR (230° C.)=6 g/10 min, Tm=130° C., ethylene content=2.0 mol %, 1-butene content=7.9 mol %
PP-4: propylene homopolymer; MFR (230° C.)=3 g/10 min, Tm=160° C.

TABLE 1-1

| Items | Units | BPR-1 Butene-1•propylene random copolymer | BPR-2 Butene-1•propylene random copolymer | BPR-3 Butene-1•propylene random copolymer |
|---|---|---|---|---|
| MFR (190° C.) | g/10 min | 4.0 | 3.4 | 4.1 |
| MFR (230° C.) | g/10 min | 11.0 | 9.4 | 11.3 |
| Comonomer content | mol % | 26.1 | 13.3 | 12.9 |
| mmmm | % | 90.7 | 93.3 | 89.6 |
| Proportion of regioerrors by 4,1-insertions | % | Nil | Nil | Nil |
| Mw [×10$^5$] | | 3.34 | 3.51 | 3.32 |
| Mn | | 1.51 | 1.52 | 1.50 |
| Mw/Mn | | 2.2 | 2.3 | 2.2 |
| [η] | g/dl | 1.1 | 1.1 | 1.1 |
| Tm (Tm-I) | ° C. | 62 | 103 | 105 |
| ΔH | J/g | 39 | 62 | 63 |
| Elution amount (−20° C.) | % | 0.0 | 0.0 | 0.0 |
| Elution amount (10° C.) | % | 0.2 | 0.1 | 0.9 |
| Elution amount ([C4] − 60° C.) | % | 0.43 (14° C.) 13.9 | 0.9 (27° C.) 26.7 | 3.8 (28° C.) 27.1 |

TABLE 1-2

| Items | Units | BER-1 Butene-1·ethylene random copolymer | BER-2 Butene-1·ethylene random copolymer | BPR-A Butene-1·propylene random copolymer |
|---|---|---|---|---|
| MFR (190° C.) | g/10 min | 0.8 | 3.9 | 3.8 |
| MFR (230° C.) | g/10 min | 2.2 | 10.7 | 12.3 |
| Comonomer content | mol % | 1.5 | 2.5 | 25.0 |
| mmmm | % | 96.5 | 96.2 | — |
| Proportion of regioerrors by 4,1-insertions | % | Undistinguishable | Undistinguishable | Nil |
| Mw [×10$^5$] | | 5.39 | 3.37 | 4.40 |
| Mn | | 2.45 | 1.60 | 0.91 |
| Mw/Mn | | 2.2 | 2.1 | 4.8 |
| [η] | g/dl | 1.5 | 1.1 | 1.3 |
| Tm (Tm-I) | ° C. | 110 | 104 | 77 |
| ΔH | J/g | 63 | 55 | 37 |
| Elution amount (−20° C.) | % | 0.0 | 0.0 | 7.2 |
| Elution amount (10° C.) | % | 0.0 | 0.0 | 7.8 |
| Elution amount ([C4] - 60° C.) | % | 5.6 (35° C.) 38.5 | 10.0 (35° C.) 37.5 | 8.72 (15° C.) 15.0 |

TABLE 1-3

| Items | Units | BER-A Butene-1·ethylene random copolymer | BER-B Butene-1·ethylene random copolymer |
|---|---|---|---|
| MFR (190° C.) | g/10 min | 1.0 | 3.8 |
| MFR (230° C.) | g/10 min | 2.8 | 10.2 |
| Comonomer content | mol % | 2.6 | 5.9 |
| mmmm | % | 95.5 | 95.2 |
| Proportion of regioerrors by 4,1-insertions | % | Undistinguishable | Undistinguishable |
| Mw [×10$^5$] | | 5.66 | 3.98 |
| Mn | | 1.45 | 1.00 |
| Mw/Mn | | 3.9 | 4.0 |
| [η] | g/dl | 1.6 | 1.2 |
| Tm (Tm-I) | ° C. | 119 | 105 |
| ΔH | J/g | 63 | 51 |
| Elution amount (−20° C.) | % | 0.01 | 5 |
| Elution amount (10° C.) | % | 7.2 | 5.7 |
| Elution amount ([C4] - 60° C.) | % | 16.2 (45° C.) | 18.2 (35° C.) |

Example 1 and Comparative Example 1 will demonstrate that the compositions of the invention have a high-level balance of low-temperature sealing properties and tack-free surface properties in the application of heat seal films of cast polypropylene (CPP) films.

[Evaluation Methods]
[Static Friction Coefficient]

The static friction coefficient was determined in accordance with ASTM D 1894. A 63.5 mm square film sample was spread and placed on a SUS plate, and a 200 g weight was placed on the film, followed by pulling at a test speed of 200 mm/min in an atmosphere at 85° C. The obtained static friction force was divided by the load to obtain the coefficient.

[Kinetic Friction Coefficient]

A glass plate having a load of 200 g was placed on the surface of a sample film and was pulled in a direction parallel to the film surface at 0.3 m/min. The force (g) required for the pulling was measured. The force was divided by the weight of the glass plate to obtain the kinetic friction coefficient (in accordance with ASTM D 1894-63).

[Blocking Force]

Sample films were allowed to stand in contact with each other under a load of 20 kg in an air oven at 40° C. for 3 days in accordance with ASTM D 1893, and the blocking coefficient (N/m) was measured.

[Heat Seal Strength]

Heat sealing was performed and the strength was measured under the following conditions.

The heat sealing faces of films were brought into contact together and were heat sealed at a prescribed temperature and a pressure of 0.2 MPa for 1 second with a seal bar width of 5 mm. The films were then allowed to cool. Test pieces having a width of 15 mm were sampled from the films that had been heat sealed at various temperatures. The heat seals of the test pieces were peeled at a cross head speed of 200 mm/min, and the peel strength was measured.

Example 1

40 Parts by mass of BPR-1 obtained in Polymerization Example 1, 60 parts by mass of PP-1, 0.08 part by mass of a lubricant (erucamide) and 0.08 part by mass of an anti-blocking agent (silica) were mixed together with a mixer. The mixture was melt kneaded in an extruder at a temperature of 200° C. and was extruded into a strand. The strand of sealant composition was cut into pellets while being cooled with water.

The pellets were melted in an extruder at a resin temperature of 200° C. In another extruder, PP-1 was melted at a resin temperature of 220° C. These were supplied to a multilayer film formation T-die fitted with a feed block and were coextruded to form a multilayer film composed of a 50 μm thick base layer and a 20 μm thick heat seal layer. The film was tested to evaluate the heat seal strength, the friction coefficients (static friction coefficient and kinetic friction coefficient) of the heat seal layer, and the blocking force. The results are described in Table 2.

Comparative Example 1

Evaluations were made in the same manner as in Example 1, except that BPR-1 was replaced by BPR-A.

Example 2

Evaluations were made in the same manner as in Example 1, except that BPR-1 was replaced by BPR-2.

Example 3

Evaluations were made in the same manner as in Example 1, except that BPR-1 was replaced by BPR-3.

The evaluation results are described in Table 2.

TABLE 2

|  |  | Ex. 1 | Comp. Ex. 1 | Ex. 2 | Ex. 3 |
|---|---|---|---|---|---|
| BPR-1 | Parts by mass | 40 | | | |
| BPR-2 | Parts by mass | | | 40 | |
| BPR-3 | Parts by mass | | | | 40 |
| BPR-A | Parts by mass | | 40 | | |
| PP-1 | Parts by mass | 60 | 60 | 60 | 60 |
| Forming method | | Casting | Casting | Casting | Casting |
| Heat seal strength Heat seal temperature | | | | | |
| 60° C. | N/15 mm | | | | |
| 70° C. | N/15 mm | 2.7 | 0.4 | 0.2 | 1.5 |
| 80° C. | N/15 mm | 15.8 | 1.2 | 0.4 | 4.2 |
| 90° C. | N/15 mm | 16.4 | 4.8 | 4.0 | 5.2 |
| 100° C. | N/15 mm | 16.9 | 5.3 | 5.4 | 5.5 |
| 110° C. | N/15 mm | 17.1 | 9.6 | 6.9 | 7.0 |
| 120° C. | N/15 mm | 17.2 | 14.7 | 15.7 | 15.8 |
| 130° C. | N/15 mm | 18.2 | 18.1 | 16.4 | 17.8 |
| 140° C. | N/15 mm | 20.3 | 19.6 | 18.7 | 19.9 |
| 150° C. | N/15 mm | 19.2 | 19.2 | 20.0 | 20.2 |
| 160° C. | N/15 mm | 20.6 | 20.5 | 19.5 | 19.1 |
| 170° C. | N/15 mm | 20.3 | 19.3 | 22.0 | 21.8 |
| 180° C. | N/15 mm | | | | |
| Friction coefficients | | | | | |
| Kinetic friction coefficient | | 0.6 | 0.6 | 0.5 | 0.5 |
| Static friction coefficient | | 0.4 | 0.4 | 0.3 | 0.3 |
| Blocking force | N/m | 9 | 9 | 6 | 6 |

As shown in Table 2 and FIG. 1, as compared to Comparative Example 1, Example 1 achieves superior performance by providing high heat seal strength at low heat seal temperatures of 70 to 100° C. and comparable friction coefficients and blocking force. Similarly, as compared to Comparative Example 1, Example 2 achieves superior performance by providing comparable seal strength at low heat seal temperatures and low friction coefficients and blocking force.

As compared to Comparative Example 1, Example 3 showed small changes in seal strength at heat seal temperatures of 80 to 100° C. This provides an excellent effect in that the films may be sealed at a wider range of acceptable seal temperatures and the degree of freedom in controlling the heat seal temperatures for package materials may be increased.

There are small changes in heat seal strength at heat seal temperatures of 80 to 100° C. In addition thereto, in the range of heat seal temperatures of 140° C. and above, the heat seal strength is a higher level and shows small changes in heat seal strength.

As demonstrated above, the present invention makes it possible to stably change heat seal strength by changing the heat seal temperature. Consequently, an excellent effect may be obtained in that the degree of freedom in controlling the heat seal strength by way of the temperatures of heat sealing of package materials may be increased.

In Example 3, two stages of stable heat seal strength were observed.

The 1-butene.α-olefin copolymers (Y) in the invention are produced with a so-called single-site catalyst. The 1-butene.α-olefin copolymers (Y) thus obtained allegedly have a uniform molecular weight distribution and a uniform composition distribution. It is therefore considered that the films will not usually show two stages of heat seal strength. This phenomenon in the present invention will not be ascribed to any single reason, but the present inventors assume that one of the reasons is that the 1-butene.α-olefin copolymer (Y) in the invention has such a low crystallization rate that several forms of crystals, namely, high-melting crystals and low-melting crystals exist in the propylene polymer. Another possible reason is that the 1-butene.α-olefin copolymer (Y) in the invention is compatibilized with the propylene polymer in such a manner that the compatibilization takes place partly and consequently produces several phases which exhibit respective characteristics independently.

Example 4

Heat Seal Layers in Biaxially-Stretched Films

15 Parts by mass of BPR-1 obtained in Polymerization Example 1, 85 parts by mass of PP-2 and 0.08 part by mass of polymethyl methacrylate particles as an antiblocking agent were mixed together with a mixer. The mixture was melt kneaded in an extruder at a temperature of 200° C. and was extruded into a strand. The strand of heat sealing composition was cut into pellets for the formation of heat seal layers while performing cooling with water.

Figure 2:
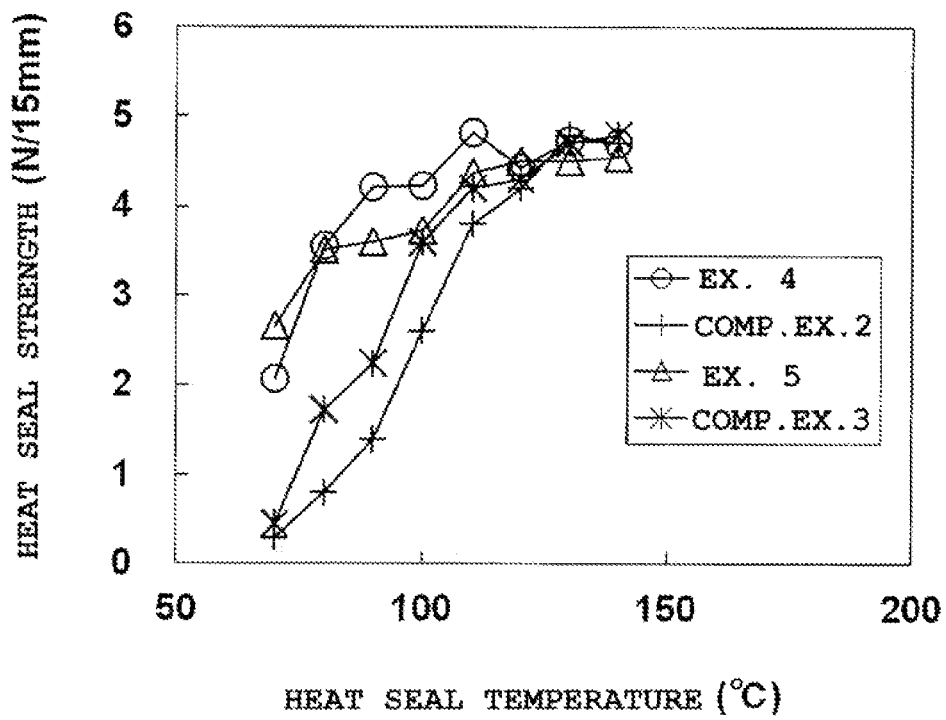
FIG. 2 is a view illustrating dependencies of heat seal strength on heat seal temperature in Examples.

The pellets for the formation of heat seal layers, and PP-4 as a resin for the formation of a base layer were extruded in respective screw extruders through a melt extrusion multi manifold T-die with an output ratio of (1/23/1), and the extrudate was rapidly cooled on a cooling roll, thereby producing a multilayer sheet having a thickness of approximately 1 mm. On a batch stretching machine, the sheet was heated at a preheating temperature of 160° C. for 1 minute, then stretched 5 times in the film flow direction (the lengthwise direction), and stretched 8 times in the direction (the traverse direction) perpendicular to the flow direction. Thus, a biaxially-stretched multilayer polypropylene film was obtained in which the thickness of the base layer was 23 µm and the thickness of each sealant layer was 1 µm (total thickness: 25 µm). The film was tested to evaluate the heat seal strength, the friction coefficients of the heat seal layer, and the blocking force. The results are described in Table 3 and FIG. 2.

Comparative Example 2

Evaluations were made in the same manner as in Example 4, except that BPR-1 was replaced by BPR-A.

Example 5

Evaluations were made in the same manner as in Example 4, except that PP-2 was replaced by PP-3.

Comparative Example 3

Evaluations were made in the same manner as in Example 5, except that BPR-1 was replaced by BPR-A.

The evaluation results are described in Table 3.

TABLE 3

|  | Units | Ex. 4 | Comp. Ex. 2 | Ex. 5 | Comp. Ex. 3 |
|---|---|---|---|---|---|
| BPR-1 | Parts by mass | 15 |  | 15 |  |
| BPR-A | Parts by mass |  | 15 |  | 15 |
| PP-2 | Parts by mass | 85 | 85 |  |  |
| PP-3 | Parts by mass |  |  | 85 | 85 |
| Forming method |  | Biaxial stretching | Biaxial stretching | Biaxial stretching | Biaxial stretching |
| Heat seal temperature |  |  |  |  |  |
| 60° C. | N/15 mm |  |  |  |  |
| 70° C. | N/15 mm | 2.1 | 0.3 | 2.7 | 0.5 |
| 80° C. | N/15 mm | 3.6 | 0.8 | 3.5 | 1.7 |
| 90° C. | N/15 mm | 4.2 | 1.4 | 3.6 | 2.3 |
| 100° C. | N/15 mm | 4.2 | 2.6 | 3.7 | 3.6 |
| 110° C. | N/15 mm | 4.8 | 3.8 | 4.4 | 4.2 |
| 120° C. | N/15 mm | 4.4 | 4.2 | 4.5 | 4.3 |
| 130° C. | N/15 mm | 4.7 | 4.8 | 4.5 | 4.7 |
| 140° C. | N/15 mm | 4.7 | 4.7 | 4.6 | 4.8 |
| Friction coefficients |  |  |  |  |  |
| Kinetic friction coefficient |  | 0.5 | 0.5 | 0.5 | 0.5 |
| Static friction coefficient |  | 0.4 | 0.4 | 0.3 | 0.3 |
| Blocking force | N/m | 0.5 | 0.5 | 0.5 | 0.4 |

As compared to Comparative Example 2, Example 4 achieves superior performance by providing high seal strength at 70 to 100° C. and comparable friction coefficients and blocking force.

As compared to Comparative Example 3, Example 5 achieves superior performance by providing high seal strength at 70 to 90° C. and comparable friction coefficients and blocking force.

Example 6

Easy Peel Heat Seal Layers

10 Parts by mass of BER-1 obtained in Polymerization Example 4 and 90 parts by mass of LDPE-1 were mixed in a mixer Pellets of the mixture were melted in an extruder at a resin temperature of 190° C. In another extruder, LDPE-1 was melted at a resin temperature of 190° C. These materials were supplied to a multilayer circular die and were coextruded at a blow up ratio of 2.0 and a forming speed of 30 m/min into a multilayer film composed of a 50 μm thick base layer and a 20 μm thick heat seal layer. The film was tested to evaluate the heat seal strength, the peelability, and the state of the peeled surface. The results are described in Table 4.

Comparative Example 4

Evaluations were made in the same manner as in Example 6, except that BER-1 was replaced by BER-A. The film was tested to evaluate the heat seal strength, the peelability, and the state of the peeled surface. The results are described in Table 4.

Example 7

10 Parts by mass of BER-2 obtained in Polymerization Example 5 and 90 parts by mass of LDPE-2 were mixed together in a mixer. Pellets of the mixture were melted in an extruder at a resin temperature of 290° C. and were extrusion laminated at a forming speed of 150 m/min onto a stack base composed of a 12 μm polyethylene terephthalate and a 30 μm polyethylene film. The film was tested to evaluate the heat seal strength, the peelability, and the state of the peeled surface. The results are described in Table 4.

Comparative Example 5

Evaluations were made in the same manner as in Example 7, except that BER-2 was replaced by BER-B. The film was tested to evaluate the heat seal strength, the peelability, and the state of the peeled surface. The results are described in Table 4.

Example 8

Evaluations were made in the same manner as in Example 7, except that BER-2 was replaced by BPR-3. The film was tested to evaluate the heat seal strength, the peelability, and the state of the peeled surface. The results are described in Table 4.

TABLE 4

|  | Units | Ex. 6 | Comp. Ex. 4 | Ex. 7 | Comp. Ex. 5 | Ex. 8 |
|---|---|---|---|---|---|---|
| BPR-3 | Parts by mass |  |  |  |  | 10 |
| BER-1 | Parts by mass | 10 |  |  |  |  |
| BER-2 | Parts by mass |  |  | 10 |  |  |
| BER-A | Parts by mass |  | 10 |  |  |  |
| BER-B | Parts by mass |  |  |  | 10 |  |
| LDPE-1 | Parts by mass | 90 | 90 |  |  |  |

TABLE 4-continued

|  | Units | Ex. 6 | Comp. Ex. 4 | Ex. 7 | Comp. Ex. 5 | Ex. 8 |
|---|---|---|---|---|---|---|
| LDPE-2 | Parts by mass |  |  | 90 | 90 | 90 |
| Forming method |  | Blown-film extrusion | Blown-film extrusion | Extrusion lamination | Extrusion lamination | Extrusion lamination |
| Forming temperature | [° C.] | 190 | 190 | 290 | 290 | 290 |
| Forming speed | [m/min] | 20 | 20 | 150 | 150 | 150 |
| Heat seal strength |  |  |  |  |  |  |
| Heat seal temperature |  |  |  |  |  |  |
| 160° C. | N/15 mm | 3.5 | 3.6 | 5.2 | 5.3 | 5.2 |
| 180° C. | N/15 mm | 3.6 | 3.5 | 5.3 | 5.2 | 5.3 |
| Peelability |  | Uniform peelability | Locally nonuniform peelability | Uniform peelability | Nonuniform peelability | Uniform peelability |
| Appearance of peeled surface |  | Good | Slight amount of fibrous residue on peeled surface | Good | Fibrous residue on peeled surface | Good |

As compared to Comparative Example 4, Example 6 resulted in excellent peelability without changes in peel strength and also resulted in clean peeling without any fibrous residues on the peeled surface.

As compared to Comparative Example 5, Example 7 and Example 8 resulted in excellent peelability without changes in peel strength and also resulted in clean peeling without any fibrous residues on the peeled surface.

Example 9

Evaluations were made in the same manner as in Example 7, except that the forming speed was changed to 100 m/min.

Example 10

Evaluations were made in the same manner as in Example 7, except that the forming speed was changed to 50 m/min.

Comparative Example 6

Evaluations were made in the same manner as in Comparative Example 5, except that the forming speed was changed to 100 m/min.

Comparative Example 7

Evaluations were made in the same manner as in Comparative Example 5, except that the forming speed was changed to 50 m/min.

The evaluation results are described in Table 5.

TABLE 5

| Items |  | Ex. 9 | Ex. 10 | Comp. Ex. 6 | Comp. Ex. 7 |
|---|---|---|---|---|---|
| BPR-3 | Parts by mass |  |  |  |  |
| BER-1 | Parts by mass |  |  |  |  |
| BER-2 | Parts by mass | 10 | 10 |  |  |
| BER-A | Parts by mass |  |  |  |  |
| BER-B | Parts by mass |  |  | 10 | 10 |
| LDPE-1 | Parts by mass |  |  |  |  |
| LDPE-2 | Parts by mass | 90 | 90 | 90 | 90 |
| Forming method |  |  |  |  |  |
| Forming temperature | [° C.] | 290 | 290 | 290 | 290 |
| Forming speed | [m/min] | 100 | 50 | 100 | 50 |
| Heat seal strength |  |  |  |  |  |
| Heat seal temperature |  |  |  |  |  |
| 160° C. | N/15 mm | 5.6 | 6.0 | 6.3 | 7.3 |
| 180° C. | N/15 mm | 5.7 | 6.1 | 6.4 | 7.5 |
| Peelability |  | Uniform peelability | Uniform peelability | Nonuniform peelability | Nonuniform peelability |
| Appearance of peeled surface |  | Good | Good | Fibrous residue on peeled surface | Fibrous residue on peeled surface |

As compared to Comparative Examples 5, 6 and 7, Examples 7, 9 and 10 achieves superior performance by providing small changes in heat seal strength irrespective of forming speeds.

Example 11

Heat Seal Layers for Easy Peel

20 Parts by mass of BER-1 obtained in Polymerization Example 4 and 80 parts by mass of LLDPE were mixed together in a mixer. Pellets of the mixture were melted in an extruder at a resin temperature of 230° C. In another extruder, LLDPE was melted at a resin temperature of 230° C. These materials were supplied to a multilayer T-die and were coextruded at a forming speed of 50 m/min into a multilayer film composed of a 50 μm thick base layer and a 20 μm thick heat seal layer. The film was tested to evaluate the heat seal strength, the peelability, and the state of the peeled surface. The results are described in Table 6.

Comparative Example 8

Evaluations were made in the same manner as in Example 11, except that BER-1 was replaced by BER-A. The results are described in Table 6.

TABLE 6

| Items | | Ex. 11 | Comp. Ex. 8 |
|---|---|---|---|
| BER-1 | Parts by mass | 20 | |
| BER-A | Parts by mass | | 20 |
| LLDPE | Parts by mass | 80 | 80 |
| Forming method | | | |
| Forming temperature | [° C.] | 230 | 230 |
| Forming speed | [m/min] | 50 | 50 |
| Heat seal strength | | | |
| Heat seal temperature | | | |
| 160° C. | N/15 mm | 7.7 | 6.8 |
| 180° C. | N/15 mm | 7.7 | 7.2 |
| Peelability | | Uniform peelability | Nonuniform peelability |
| Appearance of peeled surface | | Good | Fibrous residue on peeled surface |

The invention claimed is:

1. A 1-butene.α-olefin copolymer composition comprising:
   99 to 1 parts by mass of at least one olefin polymer (X) selected from propylene polymers (X-1) containing 50 mol % or more of propylene and ethylene polymers (X-2) containing 50 mol % or more of ethylene; and
   1 to 99 parts by mass of a 1-butene.α-olefin copolymer (Y) containing 99.9 to 70 mol % of 1-butene and 0.1 to 30 mol % of one or more α-olefins selected from ethylene, propylene and C5 to C12 α-olefins (wherein the total of the 1-butene and the one or more α-olefins selected from ethylene, propylene and C5 to C12 α-olefins is 100 mol %), having a molecular weight distribution (Mw/Mn) of 1.0 to 3.5 and having a pentad isotacticity (mmmm) of 80 to 96.5% (wherein the total of the olefin polymer (X) and the 1-butene.α-olefin copolymer (Y) in the composition is 100 parts by mass).

2. The 1-butene.α-olefin copolymer composition according to claim 1, wherein the olefin polymer (X) is one or more polymers selected from propylene polymers (X-1).

3. The 1-butene.α-olefin copolymer composition according to claim 2, wherein the propylene polymer (X-1) is one or more polymers selected from propylene random copolymers.

4. The 1-butene.α-olefin copolymer composition according to claim 1, wherein the olefin polymer (X) is one or more polymers selected from ethylene polymers (X-2).

5. The 1-butene.α-olefin copolymer composition according to claim 1, wherein the 1-butene.α-olefin copolymer (Y) is at least one or more copolymers selected from 1-butene-.ethylene copolymers (Y-1) containing 99.9 to 85 mol % of 1-butene and 0.1 to 15 mol % of ethylene [wherein the total of the 1-butene and the ethylene is 100 mol %] and 1-butene.propylene copolymers (Y-2) containing 99.9 to 70 mol % of 1-butene and 0.1 to 30 mol % of propylene (wherein the total of the 1-butene and the propylene is 100 mol %).

6. The 1-butene.α-olefin copolymer composition according to claim 1, wherein the ethylene polymer (X-2) is one or more polymers selected from high-pressure low-density polyethylenes and linear low-density polyethylenes.

7. The 1-butene.α-olefin copolymer composition according to claim 5, wherein the olefin polymer (X) is a propylene polymer (X-1) and the 1-butene.α-olefin copolymer (Y) is a 1-butene ethylene copolymer (Y-1).

8. The 1-butene.α-olefin copolymer composition according to claim 5, wherein the 1-butene ethylene copolymer (Y-1) is a 1-butene ethylene copolymer having an elution amount using o-dichlorobenzene at −10° C. of not more than 3 mass %.

9. The 1-butene.α-olefin copolymer composition according to claim 5, wherein the olefin polymer (X) is a propylene polymer (X-1) and the 1-butene.α-olefin copolymer (Y) is a 1-butene.propylene copolymer (Y-2).

10. The 1-butene.α-olefin copolymer composition according to claim 5, wherein the 1-butene propylene copolymer (Y-2) is a 1-butene propylene copolymer having an elution amount using o-dichlorobenzene at −10° C. of not more than 3 mass %.

11. The 1-butene.α-olefin copolymer composition according to claim 5, wherein the total amount of elution using o-dichlorobenzene at temperatures of not more than [Ts]° C. is 1.0 mass % to 5.0 mass % wherein [Ts] is characterized by the equation: [Ts]=[C4]−60 wherein [C4] is the proportion in mol % of 1-butene in the 1-butene propylene copolymer (Y-2).

* * * * *